No. 792,886.       Patented June 20, 1905.

UNITED STATES PATENT OFFICE.

MAX ENGELMANN, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF MAKING DIALKYL BARBITURIC ACIDS.

SPECIFICATION forming part of Letters Patent No. 792,886, dated June 20, 1905.

Application filed January 5, 1905. Serial No. 239,787.

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in a New Process of Preparing Dialkyl Barbituric Acids; and I do hereby declare the following to be an exact and clear description of my invention.

My invention relates to a new process for the production of dialkyl barbituric acids (dialkyl-2-4-6-trioxypyrimidins) having the following general formula:

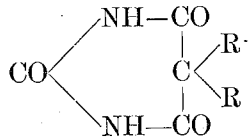

(R meaning alkyl radicals,) which bodies possess valuable therapeutic, especially soporific, properties. The process for the preparation of these compounds consists in first treating with acids the cyaniminopyrimidin derivatives having the following general formula:

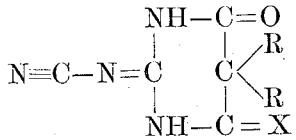

(R meaning alkyl radicals, X meaning oxygen or the imino group) and then isolating from the reaction mass the dialkyl barbituric acids thus produced. By this process the cyanimino group in 2 position and the imino group in 4 position (on using 2-cyanimino-4-imino pyrimidins) are split off and replaced by oxygen.

The above-mentioned intermediate products for the preparation of dialkyl barbituric acids can be obtained by condensation of dicyandiamid with dialkyl malonic esters (ROOC—C—COOR) or with dialkyl cyano

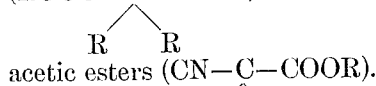

acetic esters (CN—C—COOR).

Example 1: Ten parts of 2-cyanimino-4.6-dioxy-5-diethylpyrimidin, having the melting-point 242° centigrade, (obtainable by condensing dicyandiamid with diethyl malonic ester by means of sodium ethylate,) are heated with thirty parts of a twenty-five-per-cent. hydrochloric acid for three hours at a reflux condenser. The diethylbarbituric acid precipitated during the heating is then filtered off and recrystallized from water.

Example 2: Thirty parts of 2-cyanimino-4-imino-5-diethyl-6-oxypyrimidin, melting-point 265°, (obtainable by condensation of dicyandiamid with diethyl cyano acetic ester,) are heated with one hundred parts of a twenty-per-cent. sulfuric acid for five hours at a reflux condenser. The diethylbarbituric acid thus precipitated is then filtered off and recrystallized from water.

The process proceeds in an analogous manner on using other 2-cyanimino-4-imino-5-dialkyl-6-oxypyrimidins or other 2-cyanimino-4.6-dioxy-5-dialkylpyrimidins—such as dimethyl, dipropyl derivatives, or the like—or on employing other acids, such as hydrochloric, sulfuric, oxalic acid, or the like.

Having now described my invention and in what manner the same is to be performed, what I claim as new, and desire to secure by Letters Patent, is—

1. The process for the production of 2-4-6-trioxy-5-dialkylpyrimidins, which process consists in first treating the cyaniminopyrimidins having the above-given general formula with acids and then isolating from the reaction mass the resulting dialkyl barbituric acids, substantially as hereinbefore described.

2. The process for the production of 2-4-6-trioxy-5-diethylpyrimidin, which process consists in first heating 2-cyanimino-4-imino-5-diethyl-6-oxypyrimidin with acids and then isolating the diethyl barbituric acid from the reaction mass, substantially as hereinbefore described.

In testimony whereof I have signed my name in the presence of two subscribing witnesses.

MAX ENGELMANN.

Witnesses:
 OTTO KÖNIG,
 PAUL HODEIGE.